(12) United States Patent  (10) Patent No.: US 8,392,358 B2
Dampier et al.  (45) Date of Patent: Mar. 5, 2013

(54) TEMPORAL EXTENT CONSIDERATIONS IN REPORTING ON FACTS ORGANIZED AS A DIMENSIONALLY-MODELED FACT COLLECTION

(75) Inventors: Todd O. Dampier, Mountain View, CA (US); Robert Todd Hunter, III, San Francisco, CA (US); William Banks Shulman, San Francisco, CA (US)

(73) Assignee: NICE Systems Technologies Inc., Richardson, TX (US)

( * ) Notice: Subject to any disclaimer, the term of this patent is extended or adjusted under 35 U.S.C. 154(b) by 977 days.

(21) Appl. No.: 11/427,718

(22) Filed: Jun. 29, 2006

(65) Prior Publication Data

US 2008/0005078 A1 Jan. 3, 2008

(51) Int. Cl.
*G06F 17/30* (2006.01)
(52) U.S. Cl. ........ 707/603; 707/705; 707/722; 705/7.42
(58) Field of Classification Search .............. 707/3, 603, 707/705, 722; 705/7.42
See application file for complete search history.

(56) References Cited

U.S. PATENT DOCUMENTS

| | | | | |
|---|---|---|---|---|
| 4,918,603 | A * | 4/1990 | Hughes et al. | 463/4 |
| 6,003,024 | A * | 12/1999 | Bair et al. | 707/3 |
| 6,161,103 | A | 12/2000 | Rauer et al. | |
| 6,233,573 | B1 * | 5/2001 | Bair et al. | 707/3 |
| 6,371,855 | B1 * | 4/2002 | Gavriloff | 463/42 |
| 7,415,487 | B2 * | 8/2008 | Bell et al. | 707/201 |
| 2002/0099563 | A1 | 7/2002 | Adendorff et al. | |
| 2004/0260671 | A1 * | 12/2004 | Potter et al. | 707/1 |
| 2006/0252476 | A1 * | 11/2006 | Bahou | 463/4 |
| 2007/0060325 | A1 * | 3/2007 | Gradek | 463/29 |
| 2007/0143262 | A1 * | 6/2007 | Kasperski | 707/3 |
| 2007/0243917 | A1 * | 10/2007 | Wojewoda et al. | 463/9 |

FOREIGN PATENT DOCUMENTS

EP 1450274 A 8/2004

OTHER PUBLICATIONS

Article entitled "Merced Reports", collectively dated Jun. 12, 2004.*
Article entitled "KPI Report", collectively dated Jun. 12, 2004).*
Article entitled "Fantasy Baseball Plus" by Yahoo, dated 2004.*
Article entitled "The Tradesmen" by Yahoo, dated 2000.*
Kimball, Ralph, "*Kimball Design Tip #8: Perfectly Partitioning History with the Type 2 Slowly Changing Dimension*", No. 8, May 21, 2000, www.kimballgroup.com.
Kimball, Ralph, "*Human Resource Data Marts: Design Guidelines for Querying and Analyzing Employee Data*", DBMS online, http://www.dbmsmag.com/9802d05.html, printed on Jun. 14, 2006.

(Continued)

*Primary Examiner* — Mahesh Dwivedi
(74) *Attorney, Agent, or Firm* — Pearl Cohen Zedek Latzer, LLP (57) ABSTRACT

A method/system considers the phenomenon of slowly changing dimensions in the process of reporting on facts of a collection of facts organized as, or otherwise accessible according to, a dimensionally-modeled fact collection. A report query specifies a temporal mode, and the specified temporal mode is processed to determine a time extent descriptor (e.g., in view of at least one of a context, in which the report query is made, and at least one dimension coordinate constraint). A processed result of querying the dimensionally-modeled fact collection includes appropriate indications of dimension coordinates in view of the time information from the time extent descriptor.

24 Claims, 6 Drawing Sheets

OTHER PUBLICATIONS

Kimball, Ralph, "*Surrogate Keys: Keep Control Over Record identifiers by Generating New Keys for the Data Warehouse*", DBMS online, http://www.dbmsmag.com/9805d05.html, printed on Jun. 14, 2006.

Kimball, Ralph, "*Pipelining Your Surrogates: A Good Surrogate Key System is Worth the Work*", DBMS online, http://www.dbmsmag.com/9806d05.html, printed on Jun. 14, 2006.

Rieger B., "Mastering Time Variances of Dimension Tables i n the Data Warehouse", Universitat Osnabruck, [Online] Apr. 14, 1999, XP002458645, Osnabruck, Germany, Retrieved from the Internet: URL: http://andromeda.oec.uni-osnabrueck.de/uwdstift/DMOS-Res.pdf, retrieved on Nov. 14, 2007.

Kimball R., "Kimball Design Tip #35:Modeling the Spans", Kimball Group—Kimball University, [Online] Jun. 13, 2002, XP002458646, USA, Retrieved from the Internet: URL: http://www.kimballgroup.com/html/designtipsPDF/DesignTips2002/KimballDT35ModelingSpans.pdf, retrieved on Nov. 15, 2007.

International Search Report from corresponding PCT Application PCT/2007/071814, mailed Nov. 26, 2007.

Written Opinion from corresponding PCT Application PCT/2007/071814, mailed Nov. 26, 2007.

Merced Systems, Inc., "Configuration Guide, Version 2," 2002-2003, 126 pages.

Merced Systems, Inc., "Introduction to Merced Performance Suite, Software Version 2.2," 2004, 96 pages.

\* cited by examiner

TEMPORAL EXTENT CONSIDERATIONS IN REPORTING ON FACTS ORGANIZED AS A DIMENSIONALLY-MODELED FACT COLLECTION

BACKGROUND

The present invention is in the field of considering the phenomena of slowly changing dimensions in the process of responding to a report query, to report on facts of or derived from a collection of facts organized as, or otherwise accessible according to, a dimensional data model. For shorthand throughout this description, such a collection of facts is referred to as a dimensionally-modeled fact collection.

It is known to respond to a query to a dimensionally-modeled fact collection by reporting on the facts contained in the dimensionally-modeled fact collection. Reports are typically generated to allow one to glean information from facts that are associated with locations in a dimensional data space according to which the dimensionally-modeled fact collection is modeled.

Locations in an n-dimensional data space are specified by n-tuples of coordinates, where each member of the tuple corresponds to one of the n dimensions. For example, ("San Francisco", "Sep. 30, 2002") may specify a location in a two-dimensional data space, where the dimensions are LOCATION and TIME. Coordinates need not be singled-grained entities. That is, coordinates of a single dimension may exist at, or be specified with respect to, various possible grains (levels of detail). In one example, a coordinate of a LOCATION dimension is comprised of the following grains: CONTINENT, COUNTRY, CITY.

The order of the grains may have some hierarchical significance. The grains are generally ordered such that finer grains are hierarchically "nested" inside coarser grains. Using the LOCATION dimension example, the CITY grain may be finer than the COUNTRY grain, and the COUNTRY grain may be finer than the CONTINENT grain. Where the order of the grains of a dimension has hierarchical significance, the value of a coordinate of that dimension, at a particular grain, is nominally such that the value of the coordinate of that dimension has only one value at any coarser grain for that dimension. In an example, a value of a coordinate of a LOCATION dimension may be specified at the CITY grain of the LOCATION dimension by the value "Los Angeles." This same coordinate has only one value at the COUNTRY and CONTINENT grains: "US" and "NORTH AMERICA", respectively.

There is a well-known phenomenon in the field of dimensional data modeling of "slowly changing dimensions," mentioned briefly above. This is a phenomenon in which the relationship of grains for a dimension may change over time. While it may be contrived to consider the concept of slowly changing dimensions with reference to the example LOCATION dimension (since, generally, the relationship of CONTINENT, COUNTRY and CITY grains will not change over time), there are other more realistic examples of this phenomenon.

As one illustration, consider an EMPLOYEE dimension that is intended to represent an organizational chart of a company. In this example, the EMPLOYEE dimension comprises the following grains: ORGANIZATION, DIVISION, TEAM and PERSON. Using this example, it can be seen that values of coordinates at various grains may change as a person moves from one team to another team (or, perhaps, a team moves from one division to another division). For example, in one month, Joe worked on the Red Team; the next month, he worked on the Blue Team. This may be modeled by one EMPLOYEE dimension coordinate having the value "Joe" at grain PERSON and the value "Red Team" at grain TEAM, plus a second EMPLOYEE dimension coordinate also having the value "Joe" and grain PERSON but the value "Blue Team" at grain TEAM. It is also possible to encode in the representation of the dimension coordinates the specific time intervals during which these grain relationships obtained.

The inventors have realized that it is desirable to consider the phenomenon of slowly changing dimensions in the process of reporting on facts of a collection of facts organized as, or otherwise accessible according to, a dimensionally-modeled fact collection.

SUMMARY

A method/system considers the phenomenon of slowly changing dimensions in the process of reporting on facts of a collection of facts organized as, or otherwise accessible according to, a dimensionally-modeled fact collection. A report query specifies at least one dimension coordinate constraint and a temporal mode, and the specified temporal mode is processed to determine a time extent descriptor (e.g., in view of at least one of a context, in which the report query is made, and the at least one dimension coordinate constraint). A processed result of querying the dimensionally-modeled fact collection includes appropriate indications of dimension coordinates in view of the time information from the time extent descriptor.

DETAILED DESCRIPTION

As discussed in the Background, facts of a dimensionally-modeled fact collection correspond to locations in a dimensional data space according to which the dimensionally-modeled fact collection is modeled. Moreover, the relationship of grains of a dimension may change over time—a phenomenon known as "slowly changing dimensions" (and also referred to herein as "temporal dimensions"). As also mentioned in the Background, the inventors have realized that it is desirable to consider the phenomenon of slowly changing dimensions in the process of generating a report for a dimensionally-modeled fact collection.

We thus describe herein various methods that consider the phenomenon of temporal dimensions in the process of reporting on facts of a dimensionally-modeled fact collection. It is noted that, while consideration of the facts (or the presence or absence thereof) relative to various coordinates is not precluded in the described methods, the focus of the description is with respect to the coordinates themselves, including the grain relationships. If not evident already, this distinction should become evident upon further reading of this patent application.

Before describing the methods, however, we give more background to the issue of temporal dimensions (slowly changing dimensions), using an example relative to the EMPLOYEE dimension, mentioned above, intended to represent an organizational chart of a company. The EMPLOYEE dimension comprises the grains of ORGANIZATION, DIVISION, TEAM and PERSON. In this example, various people have moved onto and off of the Red Team. This phenomenon is modeled by EMPLOYEE dimension coordinates having value "Red Team" at grain TEAM, and having values indicative of those people at grain PERSON; these dimension members and that grain relationship are further qualified by the times during which that relationship obtained. These dimension members may be represented as follows:

| value at TEAM grain | value at PERSON grain | date range for which this value at PERSON grain has the value of "Red Team" at the TEAM grain |
|---|---|---|
| Red Team | Joe | January 2005–March 2005 |
| Red Team | Mary | March 2005–July 2005 |
| Red Team | Bill | June 2005–January 2006 |

Continuing with the example, consider that the current date is January 2006, and a user requests a report, for each month of the first quarter of 2005, for each person on the Red Team, that is, with respect to locations specified by coordinates in the EMPLOYEE dimension at the PERSON grain, whose value at the TEAM grain is "Red Team." The particular facts that correspond to specified locations, or even whether there exist such facts corresponding to particular locations, is not relevant for the purpose of the example.

It is assumed that the report is to have two axes: an X axis for an indication of each month of the first quarter of 2005, and a Y axis for an indication of each person on the Red Team. However, given that the EMPLOYEE dimension is a temporal dimension, it is ambiguous as to what values at the PERSON grain should be indicated on the Y axis of the report. That is, while the TIME dimension coordinates of the report are constrained to have value "Q1-2005" at the QUARTER grain, it is ambiguous for what temporal extent of the EMPLOYEE dimension the user is requesting the report. More specifically, it is ambiguous which of the values at the PERSON grain of the EMPLOYEE dimension should be indicated on the Y axis of the report, given that the EMPLOYEE dimension coordinates of the report are constrained to have value "Red Team" at the TEAM grain.

For example, Bill was not on the Red Team at all during the first quarter of 2005. Perhaps Bill should not be included on the report since Bill was not on the Red Team during the first quarter of 2005. More specifically, referring to the TIME dimension coordinate constraints of the report being "first quarter of 2005," there is no member of the EMPLOYEE dimension having value "Bill" at grain PERSON and value "Red Team" at grain TEAM within the temporal extent corresponding to "first quarter of 2005."

But, on the other hand, perhaps Bill should indeed be included on the report, since Bill is currently on the Red Team (remember, it is assumed that the current date is January 2006). More specifically, within the temporal extent corresponding to "January 2006," there is indeed a member of the EMPLOYEE dimension having value "Bill" at grain PERSON and value "Red Team" at grain TEAM.

As another example, Mary was on the Red Team only during part (March 2005) of the first quarter of 2005. Particularly for January 2005 and February 2005, perhaps Mary should not be included on the report. Or, perhaps, for January 2005 and February 2005, Mary should be included, even if Mary was on another team for those months, since Mary was on the Red Team during at least part of the first quarter of 2005.

It can be seen, then, given that the grain relationships of the EMPLOYEE dimension can change over time, that there is ambiguity as to which values at one grain of the EMPLOYEE dimension (PERSON) should be considered related to values at another grain (TEAM) of the EMPLOYEE dimension. More particularly, there is ambiguity as to the time extent to utilize in determining, given constraints expressed, at the TEAM grain of the EMPLOYEE dimension, upon the EMPLOYEE dimension coordinates of the report, which values at the PERSON grain of the EMPLOYEE dimension should be considered to satisfy those constraints, and should therefore be represented on the report.

In accordance with an aspect, a report query specifies a temporal mode, in addition to specifying at least one dimension coordinate constraint. The specified temporal mode is processed to determine a time extent descriptor. The processing of the specified temporal mode may be in view of the dimension coordinate constraints and/or a context. A fact collection query is generated, and a result of providing the fact collection query to the dimensionally-modeled fact collection is processed.

The processed result includes an indication of dimensional values as appropriate in view of the time information from the time extent descriptor. More particularly, the time extent descriptor includes information about a period of time (i.e., from a "starting time" to an "ending time") to utilize in determining which values at one grain of a dimension should be considered to be also present at another grain (e.g., a coarser grain) of that dimension.

Figure 1:
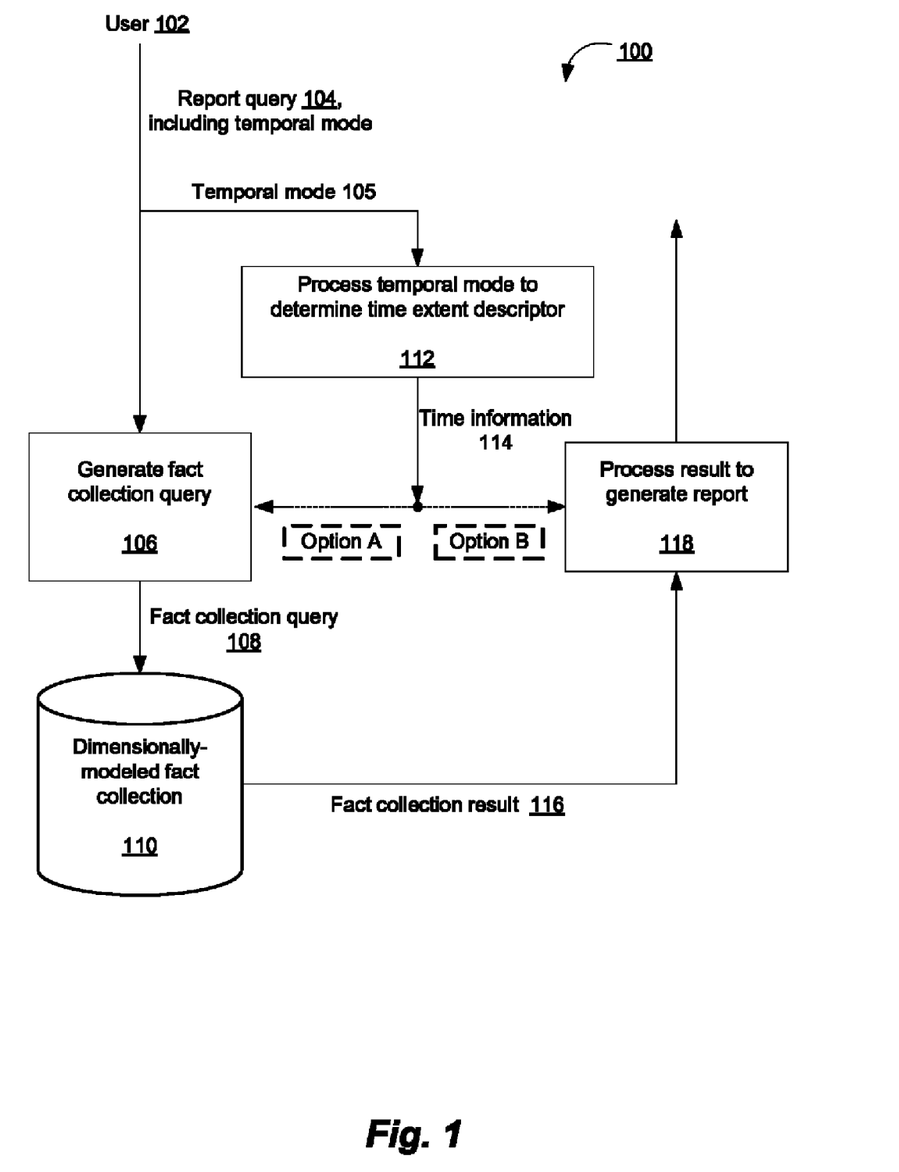
FIG. 1 is a block diagram illustrating an example architecture of a system in which a temporal mode, as part of report query to a dimensionally-modeled fact collection, is processed to determine a time extent descriptor useable to report on the facts of the dimensionally modeled fact collection.

FIG. 1 is a block diagram illustrating an example architecture of a system 100 in which the processing of the temporal mode, to determine a time extent descriptor, as well as generating a fact collection query, may take place. Referring to FIG. 1, a user 102 may cause a report query 104 to be provided to a fact collection query generator 106. For example, the user 102 may interact with a web page via a web browser, where the web page is served by a report user interface using, for example, a Java Server Page mechanism. In this example, the user 102 interacts with the web page such that the report query 104 is provided to the fact collection query generator 106. The report query 104 includes a temporal mode specification and at least one dimension coordinate constraint.

The temporal mode specification of the report query 104 is a symbolic representation of a function to determine a time extent descriptor. In a simple example, the temporal mode specification may be human-readable text such as "Now," "Beginning of Report" or "End of Report." The temporal mode processor 112 processes the temporal mode specification 105, provided as part of the report query 104, to determine a time extent descriptor. (Later, we discuss in greater detail how these temporal mode specifications, and others, may be processed according to a function to determine a time extent descriptor.)

We now discuss the dimension coordinate constraints of the report query 104. In general, a dimension coordinate constraint for a dimension of the dimensionally-modeled fact collection specifies coordinates of that dimension of the dimensionally-modeled fact collection. For example, a dimension coordinate constraint may specify coordinates of that dimension of the dimensionally-modeled fact collection by specifying a value of the dimension at a particular grain. Dimension coordinate constrains of the report query 104, then, specify a subset of coordinates of one or more dimensions of the dimensionally-modeled fact collection, on which it is desired to report.

The fact collection query generator 106 processes the report query 104 to generate an appropriate corresponding fact collection query 108, which is presented to the dimensionally-modeled fact collection 110. A result 116 of presenting the fact collection query 108 to the dimensionally-modeled fact collection 110 is processed by a report generator 118 to generate a report corresponding to the report query 104 caused to be provided by the user 102. In particular, the generated report includes an indication of dimensional members as appropriate in view of the time information 114 from the time extent descriptor 112, determined from the temporal mode 105.

In one example, the dimensionally-modeled fact collection 110 is implemented as a relational database, storing fact data in a manner that is accessible to users according to a ROLAP—Relational Online Analytical Processing—schema (fact and dimension tables). In this case, the fact collection query 108 may originate as a database query, in some form which is processed into another form, for example, which is processed by an OLAP query engine into a fact collection query 108, presented as an SQL query that is understandable by the underlying relational database. This is just one example, however, and there are many other ways of representing and accessing a dimensionally-modeled fact collection.

FIG. 1 illustrates two modes of operation of the system 100, indicated in FIG. 1 as "Option A" and "Option B." Basically, "Option A" refers to applying the time information 114 from the time extent descriptor to the processing 106 to generate the fact collection query 108. "Option B" refers to applying the time information 114 from the time extent descriptor to the processing 118 to generate the report. In accordance with either option, the generated report includes an indication of dimensional members as appropriate in view of the time information 114 from the time extent descriptor 112, determined from the temporal mode 105.

Having generally described a system and process according to which a generated report includes appropriate indications of dimensional members, we now provide some illustrations of the concept with examples. Furthermore, from the examples, it can be further seen how the focus of the described system and process is with respect to the coordinates themselves, including the grain relationships, and not with consideration of the facts (or the presence or absence thereof) relative to various coordinates.

In the following examples, illustrated in FIGS. 2 to 5, processing is only in one dimension, the EMPLOYEE dimension. As discussed above, the EMPLOYEE dimension is a temporal dimension, since the relationship of grains of the EMPLOYEE dimension may change over time. Further, for examples in which it is relevant, the context includes an indication of the current date being Mar. 16, 2005. Typically, the context is relevant for those report queries in which the function by which the temporal mode is processed to determine a time extent descriptor has, as a required parameter, some indication of the environment in which the report query is made. While the function according to which the temporal mode may be processed, to determine the time extent descriptor, may be arbitrarily defined, in the examples, we apply functions that correspond to the ordinarily understood meaning of the example specified temporal modes.

The report queries in the examples of FIGS. 2 to 5 all request values of coordinates at the PERSON grain of the EMPLOYEE dimension by constraining those coordinates to have a value of "Red Team" at the TEAM grain. That is, the dimension coordinate constraint broadly indicates a subset of the dimensionally modeled fact collection specified by coordinates at least having a value of "Red Team" at the TEAM grain of the EMPLOYEE dimension. As can be seen from the examples, without knowing the time information from a time extent descriptor determined by processing the specified temporal mode, it is ambiguous which of those coordinates having a value of "Red Team" at the TEAM grain of the EMPLOYEE dimension are actually being requested.

Figure 2:
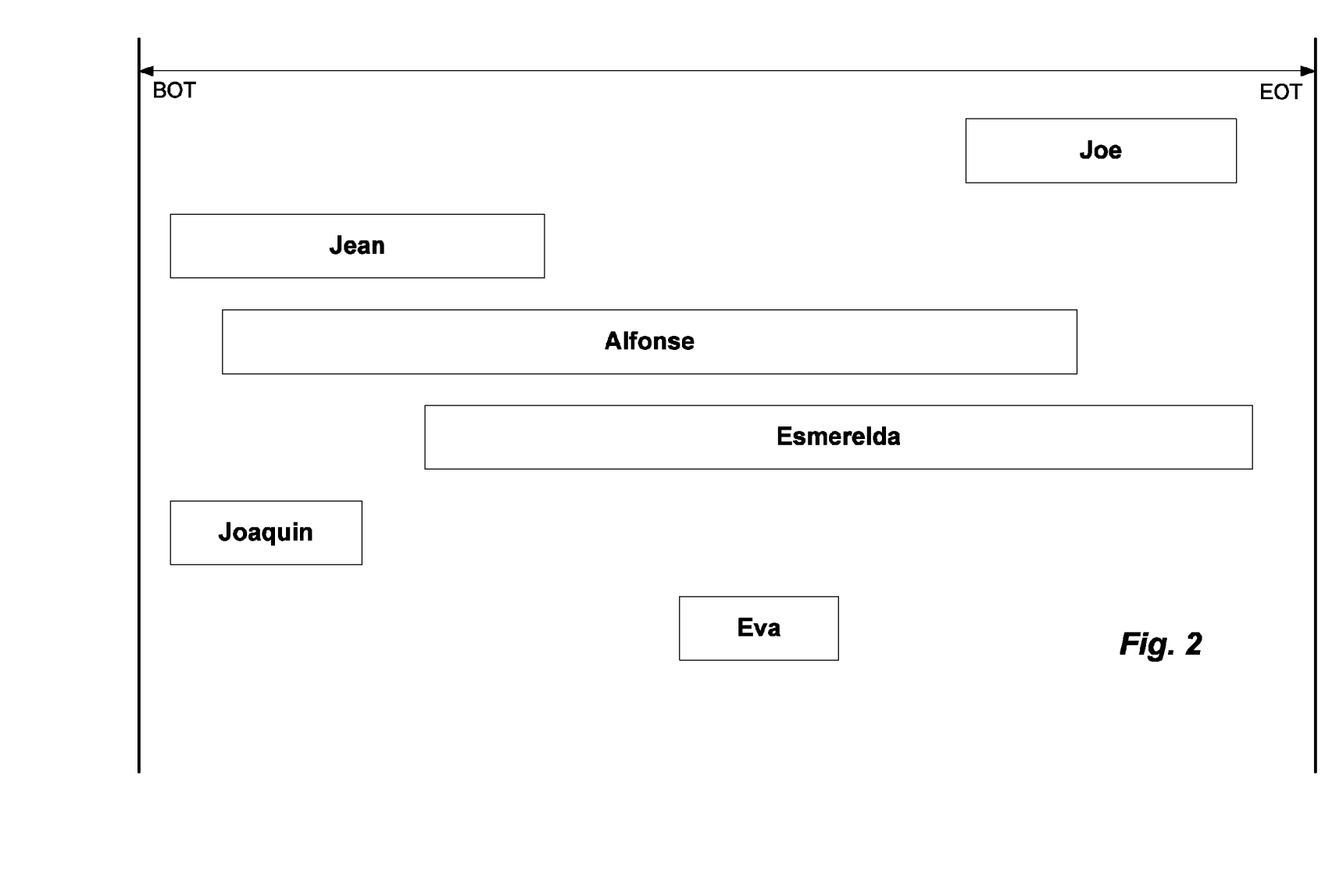
FIGS. 2 to 5 illustrate how various different temporal modes may be applied in a simple example, where processing is only in one dimension.

FIG. 2 illustrates an example of processing a report query in which the specified temporal mode is "all time." In some sense, this may be considered the same as not providing a temporal mode at all. With respect to the time information (114, in FIG. 1) from the time extent descriptor resulting from processing (112, in FIG. 1) the specified temporal mode (105, in FIG. 1), the "starting time" is theoretically the beginning of time (BOT) and the ending time is theoretically the end of time (EOT). As a practical matter, the "starting time" may be set to a time value that is at least as early as the earliest time for which there exists a coordinate of the EMPLOYEE dimension that has the value "Red Team" at the TEAM grain, and the "ending time" may be set to a time value that is at least as late as the latest time for which there exists a coordinate of the EMPLOYEE dimension that has the value "Red Team" at the TEAM grain.

The resulting report should thus include indications of dimension coordinates (e.g., labels) for all values, at the PERSON grain, of coordinates having the value of "Red Team" at the TEAM grain, at any time. Since FIG. 2 includes all the people who are members of the Red Team at any time during "all time," the resulting report should include indications of dimension coordinates for Joe, Jean, Alfonse, Esmerelda, Joaquin and Eva.

It should be noted that the report query may not even specify facts to be reported. As noted above, the focus of the description is with respect to the coordinates themselves, including the grain relationships. If, for example, the report query did not specify facts to be reported, the resulting report may contain labels only, but no facts. This can be useful, for example, to report on the grain relationships themselves (in consideration of their temporal nature), without consideration for the underlying facts at the locations specified by the coordinates existing at those grains.

Figure 3:
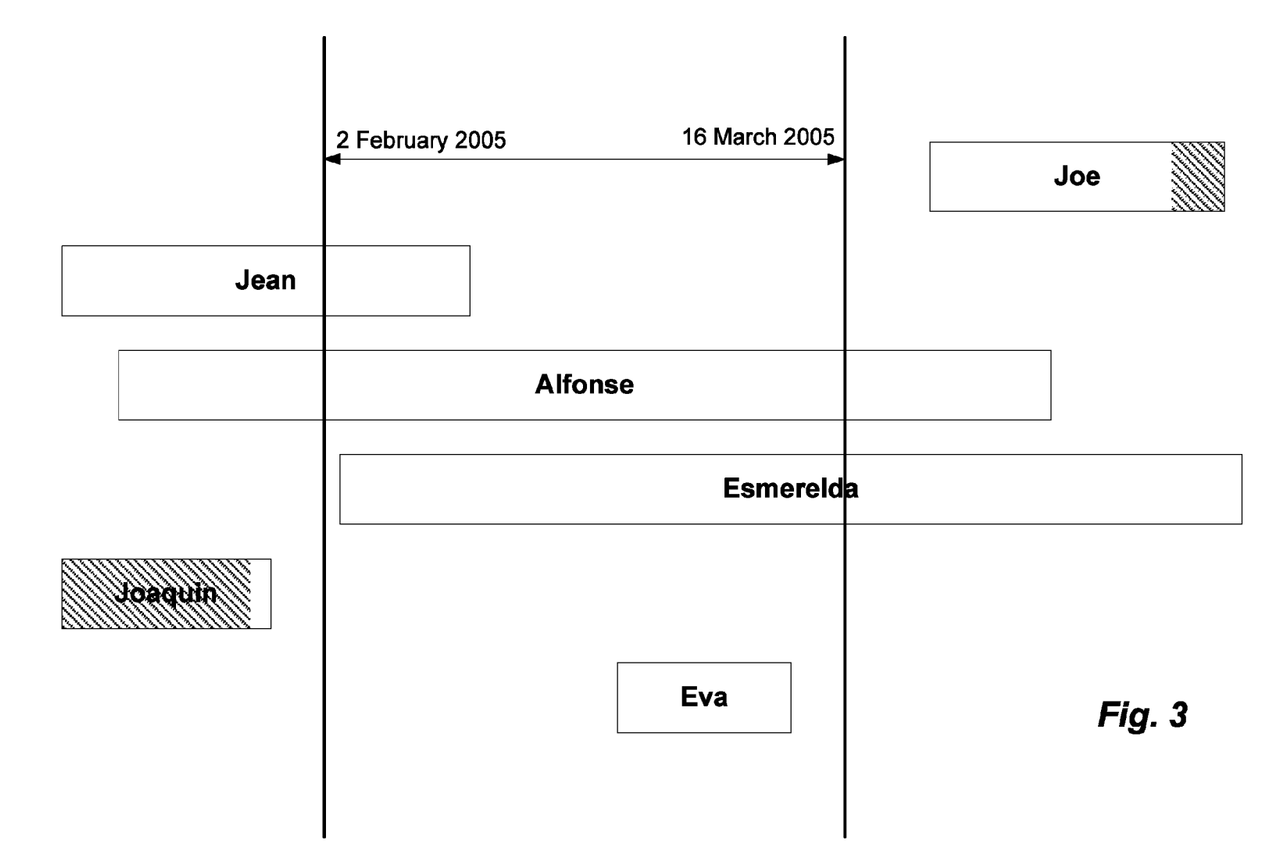

Now, turning to FIG. 3, this figure illustrates an example of processing a report query in which the temporal mode is specified with respect to the time coordinates of the report. In the example, the time coordinates of the report are Feb. 2, 2005 ("starting time") to Mar. 16, 2005 ("ending time"). It can be seen, then, that during the time period defined by the "starting time" and the "ending time," neither Joaquin nor Joe are members of the Red Team. In one example, the multidimensional fact collection includes metadata that provides information from which the temporal characteristics of the grain relationships can be discerned. (See, for example, the article entitled Kimball Design Tip #8: Perfectly Partitioning History With The Type 2 Slowly Changing Dimension," available at http://www.kimballgroup.com/html/design-tipsPDF/DesignTips2000%20/KimballDT8Perfectly.pdf, which describes augmenting dimension records with "time stamps" to temporally characterize the dimension records.)

The resulting report should thus include indications of dimension coordinates for Jean, Alfonse, Esmerelda, and Eva, but should not include indications of dimension coordinates for Joaquin and Joe.

Figure 4:
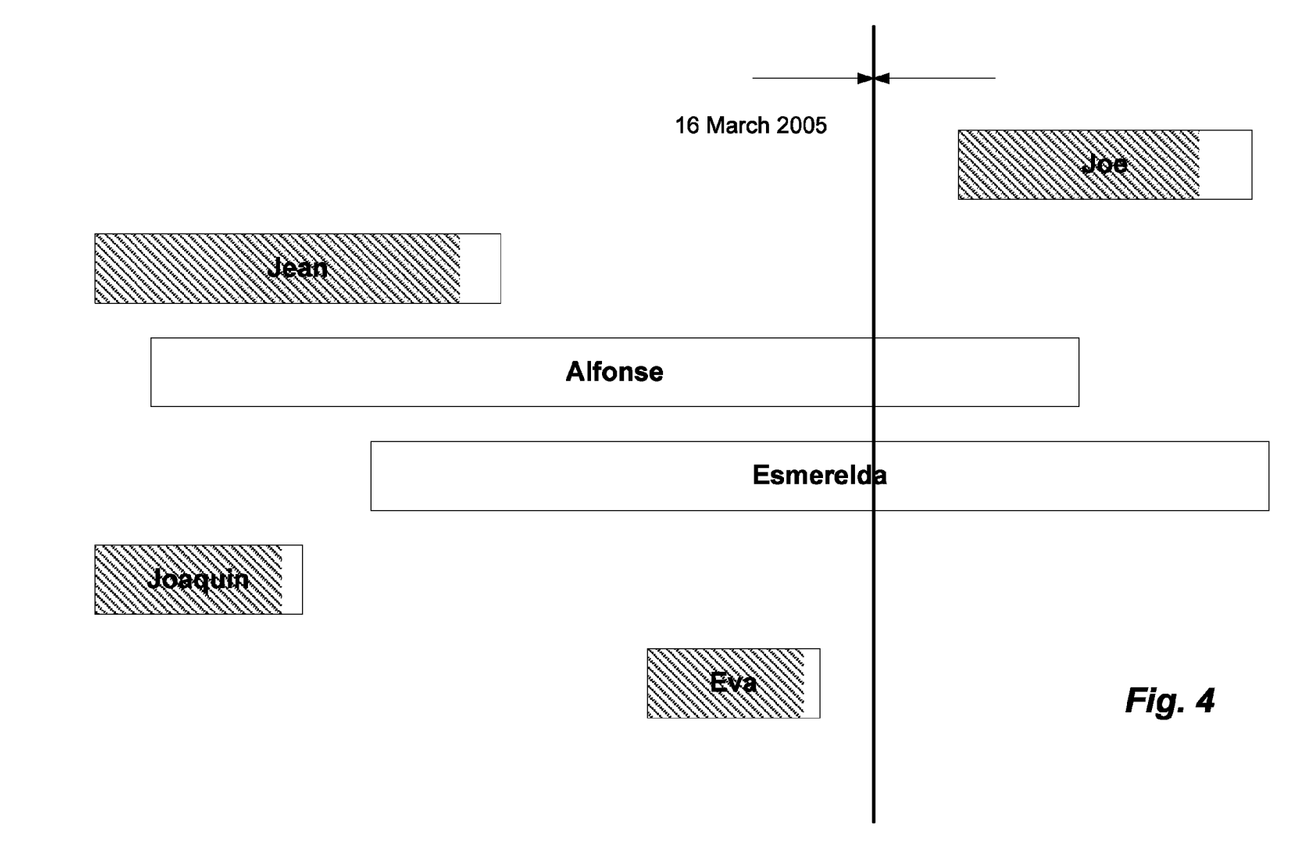

FIG. 4 illustrates an example in which the temporal mode is specified as "now," while the report coordinates are the same as in the FIG. 3 example. Unlike the FIG. 3 example, the context is used in determining the time information from the extent descriptor from the temporal mode. It can be seen that, during the time period defined by the starting time of "Mar. 16, 2005" and the ending time of "Mar. 16, 2005" (remembering that the current time is "Mar. 16, 2005"), only Alfonse and Esmerelda are members of the Red Team. Joe, Jean, Joaquin and Eva are not members of the Red Team during this time period. The resulting report should thus include indications of dimension coordinates for Alfonse and Esmerelda, but should not include indications of dimension coordinates for Joe, Jean, Joaquin and Eva. The time extent descriptor in this example is independent of the report coordinates.

Figure 5:
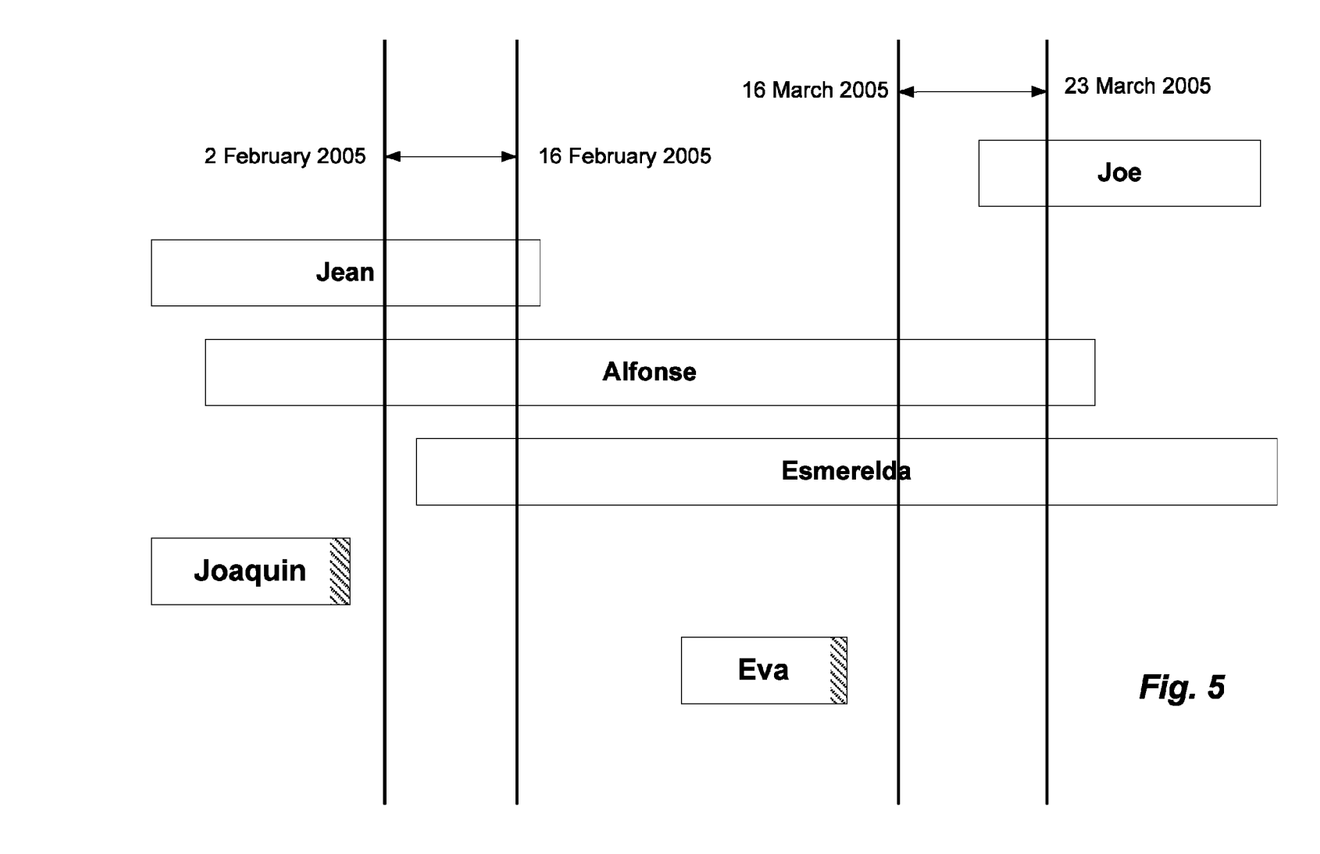

In a final example, illustrated in FIG. 5, the temporal mode is specified as a discontinuous span of three weeks. While the situation is somewhat contrived, it is viable nonetheless. The specification of the temporal mode depends neither on the report coordinates nor on the context. The time information from the extent descriptor includes two separate pairs of starting and ending times. The first pair includes a "starting time" of Feb. 2, 2005 and an "ending time" of Feb. 15, 2005. The second pair includes a "starting time" of Mar. 16, 2005 and an "ending time" of Mar. 23, 2005. During these time periods, Joe, Jean, Alfonse, and Esmerelda are members of the Red Team. During these time periods, Joaquin and Eva are not members of the Red Team.

It should be realized, then, from the previous examples, that the specified temporal mode may be processed in view of the context in which the report query is made, but for other queries, the specified temporal mode may be processed completely independent of such a context. The examples also illustrate that the specified temporal mode may be processed in view of the TIME coordinates of the report, but for other queries, the specified temporal mode may be processed completely independent of the TIME coordinates of the report. Furthermore, regardless of the manner in which the specified temporal mode may be processed, the resulting indications of dimension coordinates on the report are not dependent on the facts (or the presence or absence thereof) associated with the various coordinates indicated on the report.

Figure 6:
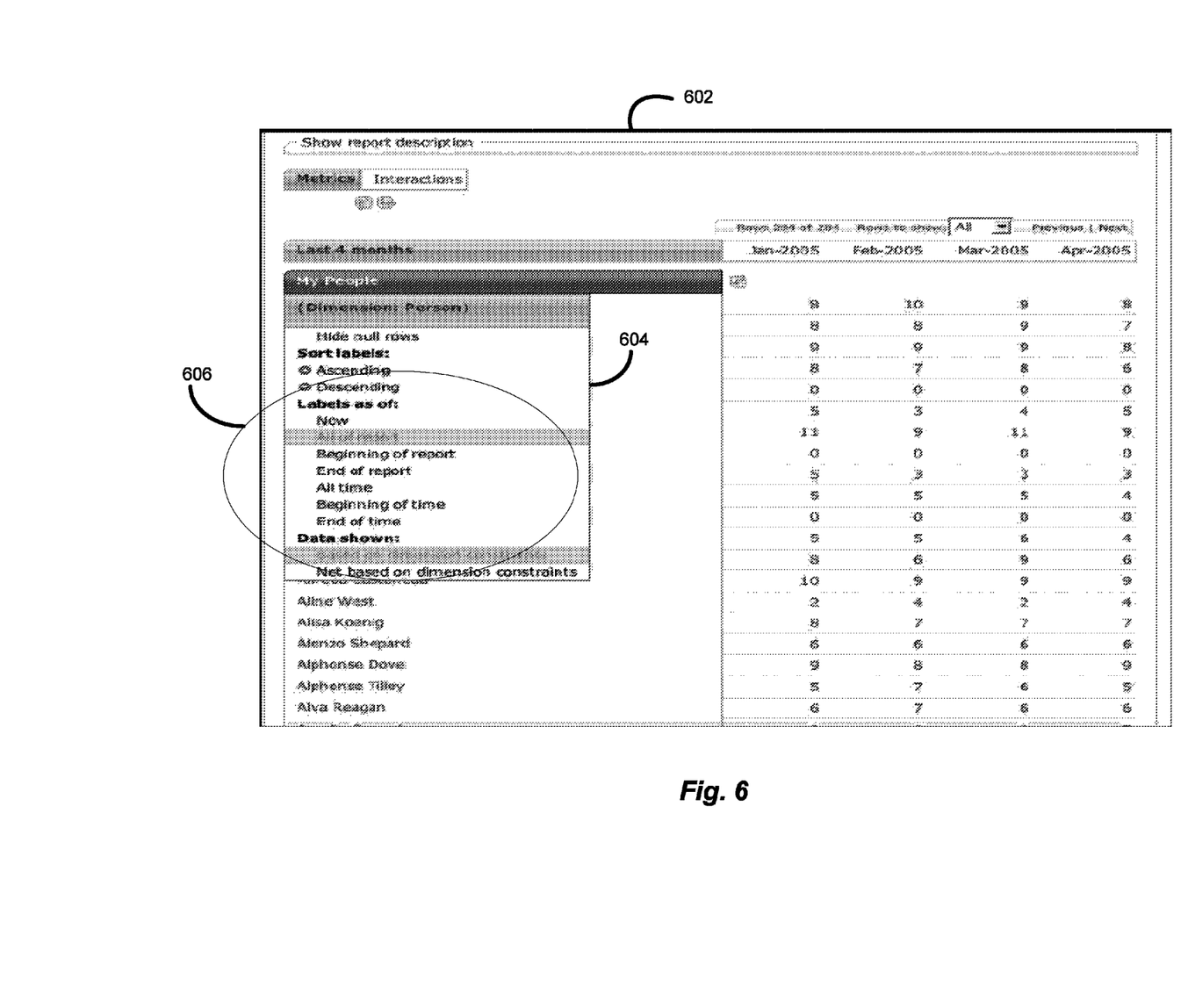
FIG. 6 illustrates an example of a report display screen 602, including functionality for a report configuration menu 604 to specify, among other things, a temporal mode corresponding to the report query.

In some examples, the specification of the temporal mode is via a user interface. FIG. 6 illustrates an example of a report display screen 602, including functionality for a report configuration menu 604 to specify, among other things, the temporal mode of the report query. In particular, the "labels as of:" portion 606 of the configuration menu 604 provides a listing of various possible temporal modes. Some of these temporal modes have been discussed with reference to FIGS. 2 to 5. A user may interact with the configuration menu 604 to choose one of the listed temporal modes in the portion 606, and the specified temporal mode is provided as part of the report query (see, e.g., the report query 104 in FIG. 1). As discussed above, the temporal mode specification is a symbolic representation of a function to determine a time extent descriptor. The portion 606 of the configuration menu 604, then, provides a user-friendly way to choose the desired function.

We have described herein a method/system that considers the phenomenon of slowly changing dimensions in the process of reporting on facts of a collection of facts organized as, or otherwise accessible according to, a dimensionally-modeled fact collection. More specifically, we have described a method/system whereby a report query may specify a temporal mode, and the specified temporal mode may be processed to determine a time extent descriptor. A processed result of querying the dimensionally-modeled fact collection includes appropriate dimensional labels in view of the time information from the time extent descriptor.

What is claimed is:

1. A method of processing a report query to a dimensionally-modeled fact collection organizing facts according to a dimensional data model in which at least one temporal dimension has grains in which at a grain level the dimensional model includes dimensional coordinate members into which available facts are organized, the method comprising:

receiving the report query, wherein the report query specifies at least one dimension coordinate constraint and a temporal mode that is a symbolic representation of a function to determine a time extent descriptor in view of at least one of a context, in which the report query is made, and the at least one dimension coordinate constraint; and processing the specified temporal mode to determine the time extent descriptor, wherein the method further comprises generating a query to the dimensionally-modeled fact collection, wherein the dimensionally-modeled fact collection is such that facts of the dimensionally-modeled fact collection correspond to locations in a dimensional data space according to which the dimensionally-modeled fact collection is modeled, and wherein a hierarchical relationship of grains of a dimension in the dimensional data model may change over time; and processing a result of providing the query to the dimensionally-modeled fact collection, wherein the time extent descriptor provides time information about a period of time to utilize to determine which dimensional coordinate members at one grain of a dimension of the dimensionally-modeled fact collection should be considered to be also present at another grain of that dimension, so as to resolve an ambiguity caused by the hierarchical relationship of the grains of the dimension having changed over time; and the processed result includes appropriate indications of dimension coordinates in view of the time information from the time extent descriptor;

wherein the processed result includes indications of only the values of the set of dimensional coordinate members that overlap the at least one dimension coordinate constraint in view of the time extent descriptor;

wherein the indications are included regardless of whether there are underlying facts for each of the dimensional members in the set of dimensional coordinate members that overlap the at least one dimension coordinate constraint in view of the time extent descriptor.

2. The method of claim 1, further comprising:

receiving, via a user interface, an indication of a temporal mode, wherein the temporal mode specified by the report query is the temporal mode whose indication is received via the user interface.

3. The method of claim 2, wherein:

the indication of the temporal mode is a human-readable textual indication.

4. The method of claim 1, wherein:

processing the specified temporal mode to determine a time extent descriptor includes applying a function that is preassociated with the specified temporal mode.

5. The method of claim 1, further comprising:
operating a user interface to present a plurality of human-readable textual indications; and responding to an activation of one of the presented plurality of human-readable textual indications by causing the report query to specify a temporal mode corresponding to the activated one human-readable textual indication.

6. The method of claim 1, wherein:
the step of processing the specified temporal mode includes processing the specified temporal mode in view of at least one of a context, in which the report query is made, and the at least one dimension coordinate constraint.

7. The method of claim 6, wherein:
processing the specified temporal mode to determine a time extent descriptor includes applying a function to the at least one of the context and the at least one dimension coordinate constraint.

8. The method of claim 6, wherein:
the function applied to the at least one of the context and the at least one dimension coordinate constraint is a function that is preassociated with the specified temporal mode.

9. The method of claim 1, wherein:
generating a query to the dimensionally-modeled fact collection includes generating the query to the dimensionally-modeled fact collection including the at least one dimension coordinate constraint and the time information from the time extent descriptor.

10. The method of claim 1, wherein:
the step of generating the query includes generating the query to include the at least one dimension coordinate constraint and the time information from the time extent descriptor.

11. The method of claim 1, wherein:
processing a result of providing the query includes filtering the result in view of the time information from the extent descriptor.

12. The method of claim 1, further comprising:
generating a report based on the appropriate indications of dimension coordinates included in the processed result.

13. The method of claim 1, wherein:
processing the specified temporal mode to determine a time extent descriptor includes determining report time information from the report query; and
determining the time extent descriptor based at least in part on the determined report time information.

14. The method of claim 1, wherein:
processing the specified temporal mode to determine a time extent descriptor includes
determining context time information from a context, in which the report query is made; and
determining the time extent descriptor based at least in part on the determined context time information.

15. The method of claim 1, wherein:
processing the specified temporal mode to determine a time extent descriptor includes determining report time information and context time information; and
determining the time extent descriptor based at least in part on the determined report time and context time information.

16. The method of claim 1, wherein:
the temporal mode indicates a function corresponding to one of "all of report," "beginning of report," "end of report," "all time," "beginning of time" and "end of time."

17. The method of claim 1, wherein:
if the temporal mode indicates a function corresponding to "all of report," then the time information from the time extent descriptor includes a starting time that is the starting time of the report and an ending time that is the ending time of the report.

18. The method of claim 1, wherein:
if the temporal mode indicates a function corresponding to "beginning of report," then the time information from the time extent descriptor includes a starting time and an ending time that are both the starting time of the report.

19. The method of claim 1, wherein:
if the temporal mode indicates a function corresponding to "end of report," then the time information from the time extent descriptor includes a starting time and an ending time that are both the ending time of the report.

20. The method of claim 1, wherein:
if the temporal mode indicates a function corresponding to "all time," then the time information from the time extent descriptor includes a starting time that is at least as early as the earliest time for which there exist dimension coordinates specified in the report query and an ending time that is at least as late as the latest time for which there exist dimension coordinates specified in the report query.

21. The method of claim 1, wherein:
if the temporal mode is a function corresponding to "beginning of time," then the time information from the time extent descriptor includes a starting time and an ending time that are at least as early as the earliest time for which there exist dimension coordinates specified in the report query.

22. The method of claim 1, wherein:
if the temporal mode indicates a function corresponding to "end of time," then the time information from the time extent descriptor includes a starting time and an ending time that are at least as late as the latest time for which there exist dimension coordinates specified in the report query.

23. The method of claim 1, wherein the indications are utilized to generate report labels on an axis of a multidimensional report.

24. A system for processing a report query to a dimensionally-modeled fact collection organizing facts according to a dimensional data model in which at least one temporal dimension has grains in which at a grain level the dimensional model includes dimensional coordinate members into which available facts are organized, the system comprising:
a processor configured to:
receive the report query, wherein the report query specifies at least one dimension coordinate constraint and a temporal mode that is a symbolic representation of a function to determine a time extent descriptor in view of at least one of a context, in which the report query is made, and the at least one dimension coordinate constraint;
process the specified temporal mode to determine the time extent descriptor;
generate a query to the dimensionally-modeled fact collection, wherein the dimensionally-modeled fact collection is such that facts of the dimensionally-modeled fact collection correspond to locations in a dimensional data space according to which the dimensionally-modeled fact collection is modeled, and wherein a hierarchical relationship of grains of a dimension in the dimensional data model may change over time; and process a result of providing the query to the dimensionally-modeled fact collection, wherein, the time extent descriptor provides time information about a period of time to utilize to determine which dimensional coordinate members at one grain of a dimension of the dimensionally-modeled fact collection should be considered to be also present at another grain of that dimension, so as to resolve an ambiguity caused by the hierarchical relationship of the grains of the dimension having changed over time; and the processed result includes appropriate indications of dimension coordinates in view of the time information from the time extent descriptor;

wherein the processed result includes indications of only the values of the set of dimensional coordinate members that overlap the at least one dimension coordinate constraint in view of the time extent descriptor;

wherein the indications are included regardless of whether there are underlying facts for each of the dimensional members in the set of dimensional coordinate members that overlap the at least one dimension coordinate constraint in view of the time extent descriptor.

* * * * *